Sept. 18, 1951 W. L. BONIN 2,568,483
NUT LOCK
Filed May 20, 1946
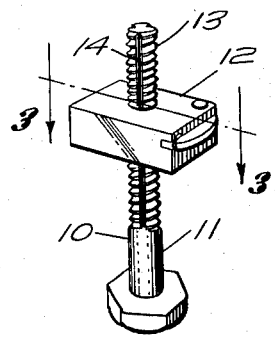
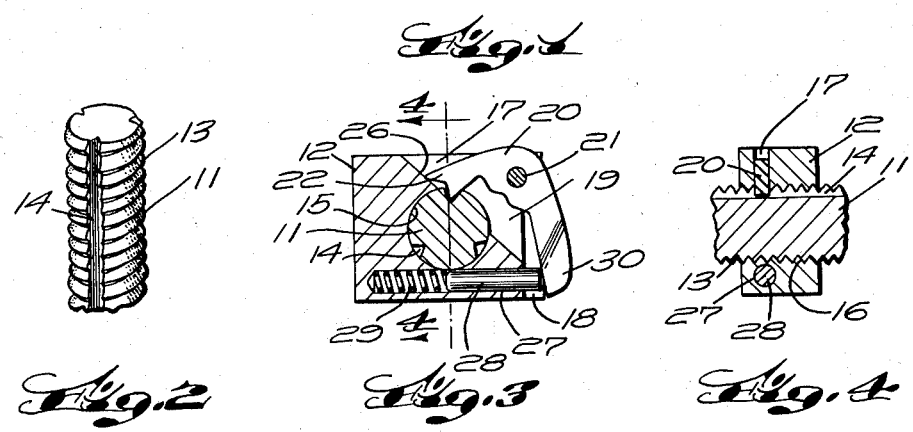
INVENTOR.
Wilfred L. Bonin
BY Nathaniel Frucht
Attorney Patented Sept. 18, 1951

2,568,483

UNITED STATES PATENT OFFICE 2,568,483

NUT LOCK

Wilfred L. Bonin, Woonsocket, R. I.

Application May 20, 1946, Serial No. 670,924

1 Claim. (Cl. 151—10)

The present invention relates to a novel nut lock designed for use with textile machinery and other apparatus which are subject to heavy pulls and to vibration.

The principal object of the invention is to provide a novel nut lock which permits a nut to be readily threaded on a bolt but prevents the nut from unthreading except by intention.

Another object of the invention is to provide an effective nut lock of very simple construction, which may be readily manufactured at low cost.

With the above and other objects and advantageous features in view, the invention consists of a novel arrangement of parts more fully disclosed in the detailed description following, in conjunction with the accompanying drawings, and more specifically defined in the appended claim.

In the drawings:

Fig. 1 is a perspective view of a nut and bolt arrangement embodying the invention;

Fig. 2 is an enlarged view of the bolt end, showing the preferred shape of lock groove;

Fig. 3 is an enlarged transverse section on the line 3—3 of Fig. 1;

Fig. 4 is a section on the line 4—4 of Fig. 3;

Fig. 5 is a perspective view of the novel lock lever; and

Fig. 6 is a perspective detail of the lock lever spring and plunger.

It has been found desirable to provide a very simple construction for an effective lock nut, whereby a low cost of manufacture results. To this end, I form the nut with a transverse slot in which a lock lever is pivotally mounted, the parts being so arranged that the movement of the lock lever is within prescribed limits only, and I position a spring pressed plunger in a bore to press against the outer end of the lock lever, the bore being in line with the lock lever slot, whereby the number of manufacturing operations is greatly reduced and the assembly is quickly performed.

Referring to the drawings, the novel nut lock arrangement 10 includes a bolt 11, which may be of any suitable material and of any suitable size, and a novel nut 12 which is designed to readily thread on the bolt 11, but which cannot be unthreaded from the bolt except by design and intention.

The bolt 11 is provided with the usual threads 13 and with a plurality of spaced longitudinal surface grooves 14, the preferred number being three. The grooves extend from the outer end of the bolt to the inner end of the screw threads 13, and are preferably of V-shaped formation.

The novel nut 12 has a central bore 15 therethrough which has internal threads 16 to cooperate with the threads 13 of the bolt 11, and is provided with a transverse slot 17 shaped to provide a narrow slot channel 18 at one end of the nut and a wider triangular shaped channel 19 which cuts across the bore 15. A lock lever 20 is pivotally mounted in the slot 17, as by means of a pin 21, and has its forward end 22 cut reentrantly as indicated at 23 to provide spaced teeth 24 and 25, the tooth 24 being adapted to enter wihin the bore 15 and selectively engage with and seat in the grooves 14, and the tooth 25 being adapted to engage the inner surface 26 of the slot and limit inward movement of the tooth 24.

A transverse bore 27 is drilled in the nut 12, in line with one side thereof, with its opening within the slot channel 18, whereby the bore may be readily formed by drilling after the slot has been cut. A plunger 28 and a compression spring 29 are positioned within the bore 27, as shown in Fig. 2, the outer end of the plunger extending into the slot channel 18 to press against the outer end 30 of the lock lever 20, thus continually urging the lock lever end 30 outwardly and the lock lever end 22 inwardly.

When the end 30 of the lever 20 is pressed outwardly by the spring pressed plunger 28, as shown in Fig. 3, it extends slightly beyond the walls of the slot channel 18 so that it may be readily manually engaged for pressing inwardly against the pressure of the spring 29, to move the end 22 outwardly and permit unthreading of the nut from the bolt.

The tooth 25 is preferably V-shaped to cooperate with the corresponding shape of the bolt grooves 14, the angular relation of the parts, see Fig. 3, being such that threading movement of the bolt forces the tooth 24 out of the grooves 14 against the spring tension exerted on the other end of the locking lever. It is thus impossible for the locking tooth 24 to catch within a groove 14 and lock against unthreading of the nut 12.

The construction for the novel lock nut arrangement is thus of simple character. The nut blank has a single slot cut therein, and two openings are drilled in the slotted nut blank, one to receive the plunger 28 and its spring 29 and the other extending transversely across the slot 17 to receive the hinge pin 21. The lock lever 20 is readily stamped out of sheet metal. The improved nut lock thus consists of a small number of readily manufactured and assembled parts, uses no flat springs which are difficult to retain in effective operative position, and has the advantage that inward movement of the locking end of the lock lever is limited by engagement with the inner surface of the slot.

Although I have described a specific constructional embodiment of my invention, it is obvious that changes in the shape, size and proportion of the parts and in their relative arrangement may be made to suit the requirements for different nut locks, without departing from the spirit and the scope of the invention as defined in the appended claim.

I claim:

In a nut lock arrangement, a threaded bolt having at least one longitudinal groove extending across the threads, and a nut having an internally threaded bore for engaging the bolt, said nut having linear sides and a channel substantially perpendicular to the bolt axis and including a narrow slot portion along one side and a triangular slot portion across one corner and into the bore, an L-shaped lock lever having its inner end formed with spaced teeth of a V shape, the outer end of the lock lever being positioned in the narrow slot portion, and the lock lever being pivotally mounted in the triangular slot portion intermediate the lever ends, one tooth of the lock lever inner end being adapted to enter the bore and seat in the bolt groove and the other tooth being adapted to contact one side of the triangular slot portion to limit bore-entering movement of the first tooth, said nut having a bore positioned diametrically opposite the lever inner end in the plane of the narrow slot portion and extending inwardly therefrom, and a spring pressed plunger movably seated in said bore and engaging the outer end of the lock lever to urge the lock lever outer end outwardly and the inner lock lever end inwardly into the internally threaded bore.

WILFRED L. BONIN.

REFERENCES CITED

The following references are of record in the file of this patent:

UNITED STATES PATENTS

| Number | Name | Date |
|---|---|---|
| 290,638 | Gibson | Dec. 18, 1883 |
| 345,842 | Grossman | July 20, 1886 |
| 879,833 | Blais | Feb. 18, 1908 |
| 982,683 | King | Jan. 24, 1911 |
| 1,000,196 | Rippingille | Aug. 8, 1911 |

FOREIGN PATENTS

| Number | Country | Date |
|---|---|---|
| 174,264 | Great Britain | Jan. 26, 1922 |